April 28, 1959 H. C. FISCHER 2,884,010
MANUFACTURE OF FIBER GLASS WEB EXPANDED FROM UNIDIRECTIONAL
FIBER GLASS MAT, AND ARTICLES MADE THEREFROM
Filed Feb. 18, 1954 3 Sheets-Sheet 1
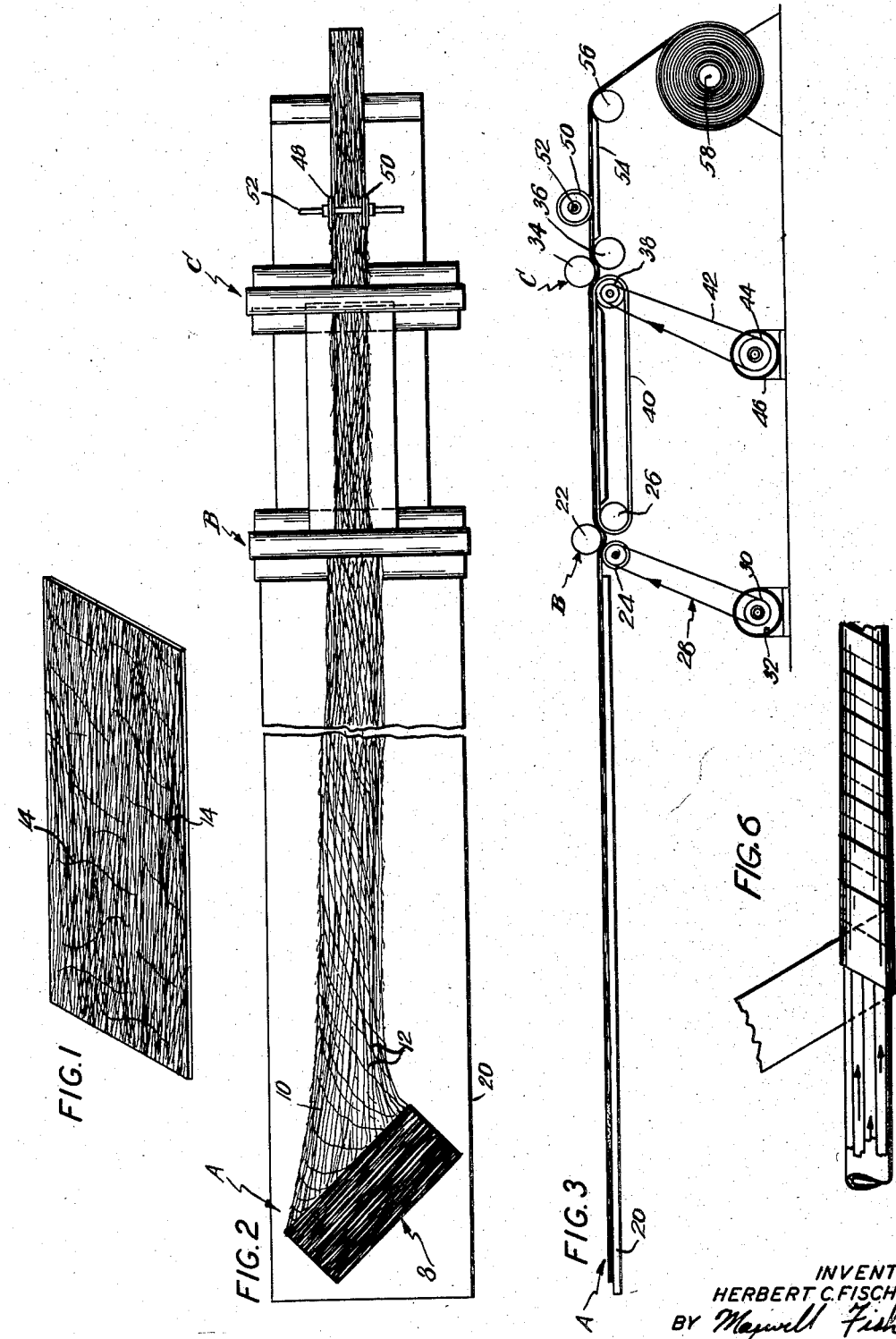
INVENTOR
HERBERT C. FISCHER
BY *Maxwell Fish*
ATTORNEY — # United States Patent Office 2,884,010
Patented Apr. 28, 1959

2,884,010

MANUFACTURE OF FIBER GLASS WEB EXPANDED FROM UNIDIRECTIONAL FIBER GLASS MAT, AND ARTICLES MADE THEREFROM

Herbert C. Fischer, Wellesley Hills, Mass., assignor to National Fibre Glass Co., Inc., West Hanover, Mass., a corporation of Massachusetts Application February 18, 1954, Serial No. 411,057

14 Claims. (Cl. 138—76)

The present invention relates to improvements in the manufacture of products from fiber glass, and more particularly to improvements in the manufacture of an expanded glass mat of high density, and of glass pipe and similarly formed articles made therefrom.

Expanded glass mats are produced from unidirectional mats which are conventionally formed by winding newly extruded fibers in closely parallel relation onto a drum which may, for example, be 4 ft. in diameter, and 6 ft. in width. When the fibers have been built up to a desired thickness the mat is removed from the drum by cutting the mat along the axial length of the drum. The mat thus formed will be slightly more than 12 ft. long, approximately 1 inch thick and 6 ft. wide. The unidirectional mat will have a maximum density of glass fiber, but is without sufficient lateral ties to permit handling in this form.

In accordance with the prior art expanded mats have been formed from the unidirectional mat above described in which the fibers are criss-crossed at substantially right angles with relation to one another, and which has, when set with a binder, many of the characteristic advantages of a woven fabric. The conventionally expanded mat referred to is formed by grasping the edge of the mat either at one end or at the mid-point of the fiber length and pulling the fibers at one side of the mat away therefrom perpendicularly to the lay of the fibers in the mat, a relatively small distance in the order of four or five feet which is sufficient to cause the fibers to cross each other at approximately right angles, the individual fibers being turned a corresponding 45° from their original position in the unidirectional mat. The expanded mat formed in this manner has been found to have certain inherent limitations, including a high degree of porosity and a tendency to stretch, which render it unfit for use in the manufacture of many products such as glass pipe requiring a maximum firmness and strength of the material.

It is a principal object of the invention to provide a web of fiber glass material from unidirectional glass mat which will have novel and improved characteristic properties including a reorientation of the fibers generally along the longitudinal axis of the web but with sufficient divergence to form slightly crossing layers producing a dense, closely compacted web in which the voids will average substantially less than would be found in conventional expanded bonded glass fiber mat, and in which a substantial degree of lateral tenacity is obtained sufficient in the raw state of the web to facilitate handling.

It is a further object of the invention to provide an improved fiber glass product such as fiber glass pipe formed from unidirectional fiber glass mat expanded as herein set forth to form a web having the fibers reoriented substantially with the longitudinal axis of the web in slightly crossing layers to form a dense, closely compacted mass. The product consists of an overlay of webs or strips thus formed which are impregnated individually with a plastic, and cured initially to an intermediate stage suitable for storage and handling, which are then assembled in the finally desired form, and which are thereafter fully cured to form the final product by a suitable application of heat and pressure.

It is a further object of the invention to provide a novel and improved method of expanding unidirectional glass mat to produce the fiber glass web, above referred to, which is well adapted for the drawing out of a glass fiber web to an extent greatly in excess of that previously considered practical, and in such a manner that the continued drawing-off or mat expanding operation causes the individual fibers to be reoriented generally in the direction of pull, and at the same time to be drawn closely together into a dense, closely compacted fiber mass.

More specifically it is an object of the invention to provide a novel method of drawing out unidirectional glass mat in which unidirectional mat is expanded by grasping and drawing the fibers from a corner of the mat in a generally diagonal direction therefrom at an angle of approximately 45°, within a few degrees more or less to form a pattern or structure of the fibers which is well adapted to effect a rapid reorientation and drafting of the relatively long fibers longitudinally of the web to any desired extent, while at the same time the fibers are sufficiently attached to one another laterally to assist in the reorientation referred to without, however, interfering with the drafting process so that the fibers are maintained in a dense, closely compacted mass irrespective of the amount of stretch or draft imparted to the web. While some latitude is permitted in either direction from a 45° diagonal direction of pull without serious loss of efficiency it has been found that if the angle of pull is increased substantially toward 90° from the lay of the fibers in the unidirectional mat a criss-cross pattern of the fibers is set up which tends to thicken or fluff with a corresponding rapid increase in the percentage of voids and a corresponding weakening in the texture of the web. A shift in the direction of pull away from the 45° angle in a direction which would cause the direction of pull to be more nearly parallel to the lay of the fibers in the unidirectional mat has a tendency to eliminate any lateral bonding of the web which results in loss of necessary lateral strength and also in an uneven distribution of fibers, which tend, under these conditions, to be drawn away from the unidirectional mat unevenly and in bunches.

In a preferred form of my method, as performed on an automatic machine adapted for the production of a continuous web of fiber glass, the corner of the mat is initially drawn off a distance of approximately 40 ft. to a first draw-off station at which the web is engaged by and positively pulled away from the unidirectional mat by power operated means.

A further and final drawing-off operation is performed between the first draw-off station, referred to, and a second draw-off station which is spaced approximately 14 ft. from the first station, or slightly more than the length of the individual fibers, and which is equipped with power means for drawing off the web engaged thereby at a rate which, in the illustrated example, is set at 2½ times the drawoff rate of the device which is the first draw-off station.

My invention will be more fully understood and the several objects and advantages will become apparent when reference is made to the detailed description of the invention which is to follow, and to the accompanying drawings in which:

Fig. 1 is a somewhat diagrammatic view of a segment of fiber glass web made in accordance with the method of the present invention;

Fig. 2 is a diagrammatic plan view of a suitable drafting machine employed for drawing off a web of glass fibers from a unidirectional mat in accordance with the invention, and further illustrating the production of the fiber glass web thereon;

Fig. 3 is a side view of the apparatus shown in Fig. 2;

Fig. 6 is a perspective view of a pipe formed from spirally wound webs of fiber glass.

Figure 4:
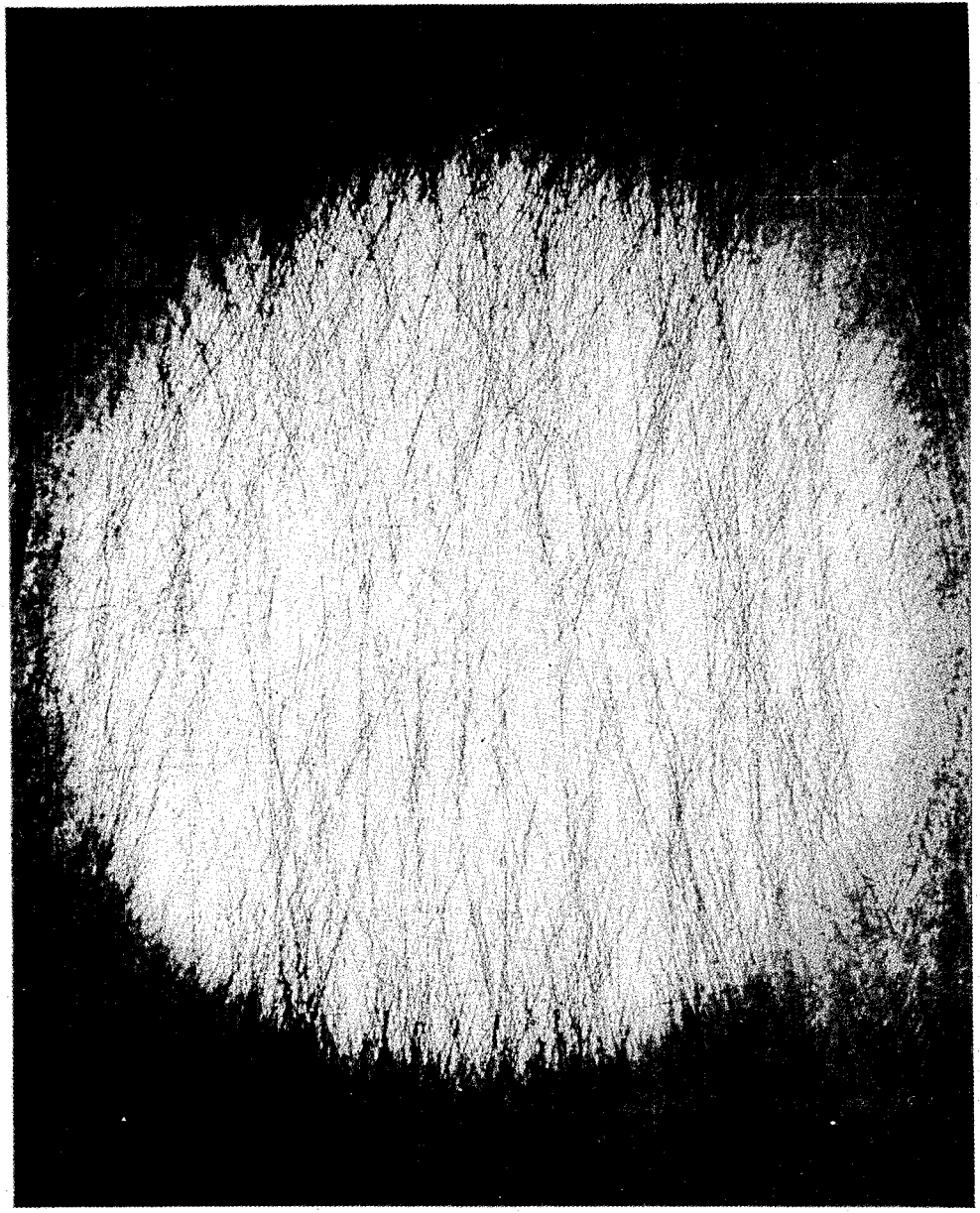
Fig. 4 is a photographic illustration of the top surface of the web taken substantially at the end of the first 40 ft. draft on the apparatus of Fig. 2.

In the manufacture of hollow or other shaped articles, such as pipe, from fiber glass difficulty has been experienced in providing an arrangement or lay of the glass fibers which will produce a maximum density of the glass and at the same time a sufficient tying-in of the fibers laterally to permit handling of the fiber glass web, and which may be most efficiently combined with an impregnating agent or binder such as a phenolic resin to produce a solid article having the maximum strength of the included glass fiber.

In carrying out the present invention I provide as an intermediate product a strip or web of fiber glass which is expanded from a unidirectional glass mat in such a manner as to cause the fibers having substantially the length of original mat to be reoriented generally in the direction of pull employed in the expanding process so that reoriented fibers are drawn into a dense, closely compacted relation with only sufficient overlap or crossover to ensure an adequate mechanical bond in a lateral direction to permit handling and without substantially increasing the percentage of voids in the web.

Further in accordance with the invention the fiber glass web or strip, referred to, is impregnated with a suitable plastic binder which may be either a thermosetting or thermoplastic type synthetic resin. When a phenolic resin is used it is preferred to partially cure the resin to an intermediate stage for storage and subsequent application, sufficient heat having been applied to drive off the more volatile solvents contained in the applied solution. The fiber glass referred to has a glass density substantially higher than that found in conventional bonded mat, but which would not exceed 90%.

I have found that a web or strip of fiber glass having the characteristics above described, and impregnated with any suitable binder which may for example be a phenolic resin which is then processed to the intermediate stage, is well adapted to be applied as a spiral wrapping on a suitable mandrel for the formation of glass pipe. The fiber glass strip or web, when laid up in spiral form with a suitable simultaneous application of heat and pressure to effect a final setting and curing of the phenolic resin, has been found to produce a glass pipe of maximum density and of great strength.

Referring to Fig. 1 of the drawings, an expanded fiber glass strip or web is shown expanded from a unidirectional glass mat 8 in accordance with my invention. The mat 8 is conventionally formed by means of a drum winding operation in which the fibers are moved longitudinally of the drum during rotation. The fibers in the mat 8 are thus laid in crossing layers, each of which deviates from the longitudinal axis of the mat in one direction or the other by a small angle which, in the example shown, is approximately 17 minutes. During the drawing-off operation the fibers tend to be drawn off in corresponding layers from the top surface of the mat 8.

In accordance with my invention the fibers are drawn off and the web is formed in a diagonal direction approximately 45° from the longitudinal axis of the unidirectional mat from one corner of the mat with the result that the fibers rearrange themselves in a novel manner which permits the web formed to be extended by drafting operations to any desired extent without any tendency to fluffing or thickening, while at the same time a characteristic uniform texture is maintained caused by the reorientation of the fibers substantially in the direction of pull with, however, a sufficient intermingling thereof to insure adequate lateral tenacity for handling and to insure a maximum strength of the mat when subsequently impregnated with a suitable binder. The novel manner in which the fibers are reoriented to produce my improved expanded mat or web of glass fibers will be described in connection with the somewhat diagrammatic showing of Fig. 1 taken in connection with the photographs of the process at different stages of Figs. 4 and 5. As previously noted, the fibers as they are drawn off at approximately a 45° angle from the longitudinal axis of the unidirectional unit tend, as a result of the slight crossing angle of lay in the unidirectional mat, to peel off in successive layers in an orderly fashion.

As indicated in Fig. 2, many of the fibers designated at 10, as they are separated at their right hand ends from the mat 8, will be drawn into a diagonal position extending toward the right side of the web. Other fibers 12 in close juxtaposition to the fibers 10 which may have been caught in the left hand edge or at some intermediate point in the web will be drawn in an opposite direction so that they extend diagonally toward the left side of the web. Reference as at this point may be had to Fig. 4 which illustrates photographically the condition of the fibers in the web substantially at the end of the first 40 ft. draft and before the web passes through the first draw-off station hereinafter described.

For the intermediate position here shown the fibers have been reoriented to a substantial extent, the crisscross pattern produced being still very pronounced. As shown in Fig. 4 there are a relatively small number of broken or looped transversely extending fiber portions 14. The drafting of the web is continued, as shown in Fig. 2, until the web has been expanded between 3 and 4 times the length of the individual fibers so that the fibers 10 and 12 will have been reoriented more closely along the longitudinal axis of the web. The positions of the fibers at this point are shown specifically in a photograph of Fig. 5. As will readily be observed from this photograph the individual fibers have been drawn out and reoriented generally in the draw-off direction. The fibers, however, still appear to be divided generally into diagonally extending groups which cross one another at a slight angle and with the intermingling of occasional looped or crossing ends sufficient to obtain the desired lateral tenacity in the web.

Figure 5:
Fig. 5 is a photographic illustration of the top surface of the web taken at the completion of the drafting or expanding operation, and after the edges of the web have been trimmed by trimming knives.

Characteristics of the fiber glass web expanded from the unidirectional fiber glass mat, as shown in the diagrammatic Fig. 2 and in the photographic illustration of Fig. 5, include the use of relatively long cut fibers which have substantially the length of the unidirectional glass mat, which are slid past one another by means of the expanding or drafting operation, and which are reoriented substantially along the length of the web, so that the web will have a maximum tensile strength longitudinally of the web, the individual fibers being further disposed generally in two groups in slightly crossing relation, and with a small admixture of looped, broken and laterally extending ends so that a substantial degree of lateral tenacity of the fiber glass web is obtained.

A further characteristic of the fiber glass web shown in Figs. 2 and 5 consists in the relatively high degree of density of the glass fibers in the expanded web which may run as high as 90% with voids running at 10% or more.

The fiber glass web, expanded from fiber glass mat in the manner here described, when treated with a suitable binder has been found particularly effective as an intermediate product suitable for use in the manufacture of fiber glass pipe and similar products. The reorientation of the relatively long fibers substantially lengthwise of the web together with the characteristic intermingling or crossing to provide a high degree of lateral tenacity, and at the same time, a relatively small optimum percentage of voids which would be in the order of 10% or more, provides a structure which is especially suited for treating with a suitable plastic to provide a fiber glass web of maximum strength longitudinally, and also a substantial degree of strength laterally. It is proposed in accordance with the teaching of my co-pending application Ser. No. 346,689, filed April 3, 1953, now Patent No. 2,828,239, granted March 25, 1958, for Manufacture of Glass Fiber Tube Forming Machine, to impregnate the expanded mat with a suitable plastic which may be a phenolic resin which is then partially cured to an intermediate stage. The fiber glass pipe which is taken as a preferred example of a product formed in accordance with my method is then built up preferably by wrapping the partially processed fiber glass webs as laminates on a mandrel, the pipe then being subjected to heat and pressure in suitable amounts to fully cure the plastic.

It will be understood that the draft or expansion to which the web is subjected in accordance with the present invention may be varied within wide limits, and that while an expansion of approximately three to four times the length of the original fibers is preferred, a substantially increased expansion of the web is feasible, or if so desired an expansion of less extent may be employed. Any increase in the amount of expansion will tend to further thin down and narrow the web produced, but without any substantial decrease in density. Where the amount of expansion imparted to the web is substantially decreased a more pronounced criss-cross pattern of the fibers in the several fiber layers or strata will be observed in the expanded web. The density of the web is somewhat decreased.

The process of expanding unidirectional glass mat to produce the expanded fiber glass web above described is well adapted to be carried out on an automatic machine operating continuously to produce expanded fiber glass mat.

Referring specifically to Figs. 2 and 3 of the drawings a mat expanding apparatus is provided which comprises a starting station A comprising a plate 20 on which the unidirectional mat may be supported in a diagonal position. At the end of the plate 20, at a distance of approximately 30 feet from the station A at which the unidirectional mat is located, there is a first draw-off station B which comprises friction driving rollers 22 and 24, and a friction belt carrying roller 26. During the travel between the start station A and the first draw-off station B the expanding mat or web is supported on the plate 20. The driving roller 24 at station B may be driven at any desired rate adapted for the efficient handling of the fiber glass material drawn off from the unidirectional mat. The driving connections may include a driving belt 28, which passes over a pulley at one end of the roller 24, and over a pulley 30 carried on the drive shaft of a motor 32. The web is now drawn past a second draw-off station C at a rate which is preferably 2½ times the linear driving rate of roller 24, in order to produce a still further expansion and setting of the expanding mat or web. The draw-off station C comprises friction rollers 34 and 36, and a friction belt carrying roller 38. A friction belt 40 mounted on the rollers 26 and 38 supports the web during the travel between the draw-off stations B and C, these parts being driven, in the apparatus shown, at 2½ times the linear rate of the roller 24 of station B by means of a driving belt 42 which passes over a pulley at one end of the roller 38, and over a pulley 44 on the drive shaft of an electric motor 46. The web passing from station C is then trimmed by means of edge trimming knives 48 and 50 carried by a shaft 52 mounted above a supporting plate 54 and adapted to be continuously driven by any suitable means, not shown. The fully expanded and trimmed fiber glass web then passes over an idler roller 56, and is wound on a beam 58.

The fiber glass web which I have developed in accordance with the present invention is particularly adapted for use in and has made possible the construction of a stronger and more efficient tubular glass pipe than has heretofore been produced.

As previously noted the web is formed with fibers of substantial length which are arranged substantially longitudinally of the web, but which are sufficiently crossed and intermingled to give substantial tenacity to the web laterally of its length. The web is further formed with an optimum density of glass fibers with only sufficient voids remaining to insure an efficient impregnation of the web with the plastic binding material. When one or more webs are now wound in a spiral form which may or may not be in opposite directions onto a mandrel having the desired cross-sectional shape, it will readily be seen that the great strength of the web along its length is most efficiently employed to build a pipe having a maximum bursting strength. The substantial lateral tenacity inherent in the web further improves the strength characteristic of the finished product. A high density of glass insures a most efficient proportion of glass and plastic in the laminated pipe structure so that the final hardening or curing operation has the effect of forming a glass pipe of maximum strength and durability.

The invention having been described what is claimed is:

1. The method of expanding a unidirectional fiber glass mat comprising the individual fibers extending the length of the mat in crossing layers which deviate from the longitudinal direction of the mat by a small angle first in one and then in the other direction to form a web of glass fibers, which comprises drawing off the glass fibers diagonally from one corner of the unidirectional glass mat.

2. The method of expanding a unidirectional fiber glass mat comprising the individual fibers extending the length of the mat in crossing layers which deviate from the longitudinal direction of the mat by a small angle first in one and then in the other direction to form a web of glass fibers, which comprises drawing off the glass fibers diagonally from one corner of the unidirectional glass mat at a 45° angle within a few degrees more or less from the longitudinal direction of alignment of the fibers in the mat, said drawing off being continued to produce a reorientation of the bulk of said fibers substantially in the direction of pull longitudinally of said web.

3. The method of expanding a unidirectional fiber glass mat comprising the individual fibers extending the length of the mat in crossing layers which deviate from the longitudinal direction of the mat by a small angle first in one and then in the other direction to form a web of glass fibers which comprises drawing off the fiber glass mat diagonally at a 45° angle within a few degrees more or less from the longitudinal direction of alignment of the fibers in the mat, said drawing off operation being continued to produce a reorientation of the bulk of said fibers substantially in the direction of pull longitudinally of said web and an expansion of the mat in the order of at least three to four times the length of the fibers in the unidirectional mat.

4. The method of expanding a unidirectional fiber glass mat having the individual fibers extending the length of the mat to form a web of glass fibers, which comprises drawing off the glass fibers diagonally from one corner of the unidirectional glass mat at a first rate to a fixed draw-off point disposed approximately three times the fiber length from the mat, and drawing off the expanded web at a second faster rate from said first draw-off point to a second draw-off point disposed more than one fiber length from said first draw-off point.

5. The method of forming a fiber glass product from a unidirectional fiber glass mat comprising individual fibers extending the length of the mat in crossing layers which deviate from the longitudinal direction of the mat by a small angle first in one and then in the other direction, which comprises drawing off the glass fibers diagonally from one corner of the mat through a distance sufficient to effect a substantial reorientation of the bulk of the fibers lengthwise of said web, impregnating said web with plastic, and partially curing said plastic.

6. The method of forming a fiber glass product from a unidirectional fiber glass mat comprising individual fibers extending the length of the mat in crossing layers which deviate from the longitudinal direction of the mat by a small angle first in one and then in the other direction, which comprises drawing off the glass fibers diagonally from one corner of the mat through a distance sufficient to effect a substantial reorientation of the bulk of the fibers lengthwise of said web, impregnating said web with a phenolic resin, and subjecting said impregnated web to heat sufficient to drive off the volatile elements of said phenolic resin and thereby to cure said phenolic resin to an intermediate stage.

7. A fiber glass web expanded from a unidirectional fiber glass mat in which the individual fibers thereof extend the length of the mat comprising crossing layers which deviate from the longitudinal direction of the mat by a small angle first in one and then in the other direction, which comprises a web formed of said glass fibers of a length approximating the length of said fiber glass mat, said web having been expanded diagonally to the lay of the fibers in the mat from three to five times the length of said unidirectional fiber glass mat whereby said fibers are reoriented substantially in the direction of pull and with said fibers arranged in slightly crossed relation along the length of said web and with a small admixture of random cross ends, said web being characterized by a high density of glass fiber, great strength longitudinally of the web, and sufficient tenacity laterally of the web to permit handling.

8. A fiber glass web expanded from a unidirectional fiber glass mat comprising individual fibers extending the length of the mat in crossing layers which deviate from the longitudinal direction of the mat by a small angle first in one and then in the other direction, of which the individual fibers extend the length of the mat, which comprises a web expanded diagonally from said unidirectional fiber glass mat, formed of said glass fibers of a length approximating the length of the unidirectional fiber glass mat, having the fibers reoriented substantially along the length of the web, slightly crossed with relation to one another, and with a small admixture of random cross ends to provide a fiber glass web of high density of glass fiber and with voids totaling not less than 10% of the volume of the web.

9. A fiber glass web expanded from a unidirectional fiber glass mat of which the individual fibers extend the length of the mat in crossing layers which deviate from the longitudinal direction by a small angle first in one and then in the other direction, which comprises a web expanded in a diagonal direction with relation to the lay of the fibers in the unidirectional fiber glass mat, said web being impregnated with a suitable plastic.

10. An intermediate product in the manufacture of fiber glass articles which comprises a web of glass fibers expanded diagonally from unidirectional glass mat having fibers extending the length of the mat in crossing layers which deviate from the longitudinal axis of the mat by a small angle first in one and then in the other direction, the individual fibers of said product web being substantially of the length of said fiber glass mat, extending generally lengthwise of the web in slightly crossed relation and with a small admixture of cross ends providing a web with a high density of glass fiber with a mixture of voids in excess of 10%, said web being impregnated with a suitable binder of the class consisting of thermosetting and thermoplastic resins and the impregnated web partially cured.

11. The method of forming glass pipe from unidirectional fiber glass mat having fibers extending the length of the mat in crossing layers which deviate from the longitudinal direction of the mat by a small angle first in one and then in the other direction, which comprises drawing off the glass fibers diagonally from one corner of the mat to a distance sufficient to effect a substantial reorientation of the bulk of the fibers lengthwise of said web, impregnating said web with a suitable binder of the class consisting of thermosetting and thermoplastic resins, applying said web as a laminate to form the pipe, and setting the resin in the laminates to form a solid pipe.

12. The method of forming glass pipe from unidirectional fiber glass mat comprising individual fibers extending the length of the mat in crossing layers which deviate from the longitudinal direction of the mat by a small angle first in one and then in the other direction, which comprises drawing off the glass fibers diagonally from one corner of the mat to a distance sufficient to effect a reorientation of the bulk of the fibers lengthwise of the web, impregnating said web with a phenolic resin and processing the impregnated web to an intermediate stage, applying a plurality of said webs spirally to a mandrel as laminates in opposite directions to form a pipe, and further curing and hardening said phenolic resin in the laminates to form a solid pipe.

13. A fiber glass pipe, which comprises a web of glass fibers expanded diagonally from unidirectional glass mat comprising individual fibers extending the length of the mat in crossing layers which deviate from the longitudinal direction of the mat by a small angle first in one and then in the other direction, the individual fibers of said web having substantially the length of said fiber glass mat expanded so that the individual fibers extend generally lengthwise of the web in slightly crossed relation and with a small admixture of random crossed ends, said web being impregnated with a phenolic resin and applied spirally of the axis of the pipe to the cross-sectional shape of the pipe, and set to form a solid mass.

14. A fiber glass article which comprises web of glass fibers expanded diagonally from unidirectional glass mat comprising individual fibers extending the length of the mat in crossing layers which deviate from the longitudinal direction of the mat by a small angle first in one and then in the other direction, the individual fibers of said web having substantially the length of said fiber glass mat, extending generally lengthwise of the web in slightly crossed relation, and with a small admixture of random cross ends, said web being impregnated with a suitable plastic and applied in laminate form to the shape of the article and set to form a solid mass of said fibers.

References Cited in the file of this patent
UNITED STATES PATENTS

| Re. 1,714 | Goulding | June 28, 1864 |
|---|---|---|
| 2,486,127 | Stack et al. | Oct. 25, 1949 |
| 2,546,230 | Modigliani | Mar. 27, 1951 |
| 2,584,702 | Hogendobler | Feb. 5, 1952 |
| 2,609,320 | Modigliani | Sept. 2, 1952 |
| 2,644,780 | Simkins et al. | July 7, 1953 |
| 2,653,887 | Slayter | Sept. 29, 1953 |